A. F. VOSS.
INLET AND RELIEF VALVE FOR PNEUMATIC TIRES.
APPLICATION FILED NOV. 30, 1914.
1,139,935.
Patented May 18, 1915.
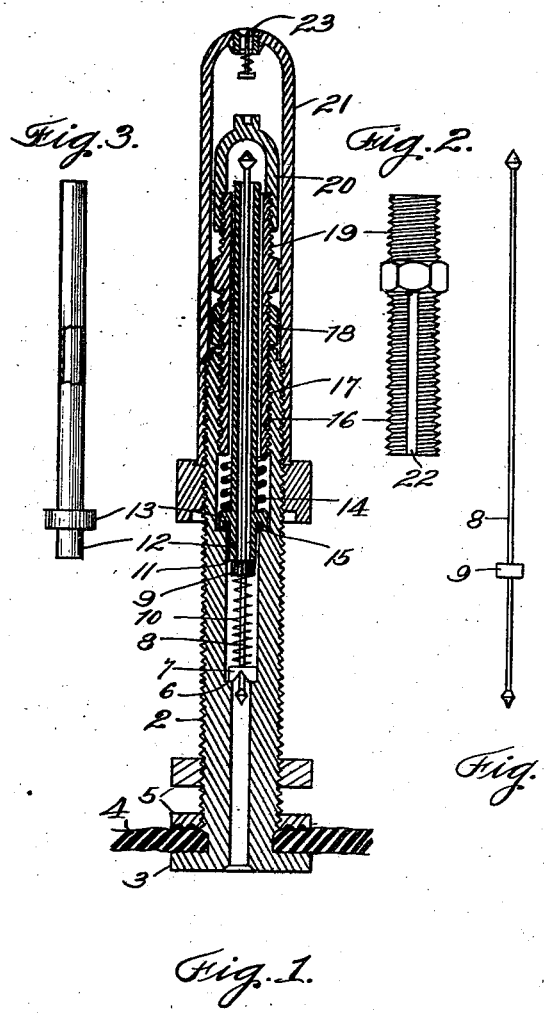
WITNESSES:
INVENTOR

UNITED STATES PATENT OFFICE.

ANTON F. VOSS, OF SAN FRANCISCO, CALIFORNIA.

INLET AND RELIEF VALVE FOR PNEUMATIC TIRES.

1,139,935.  Specification of Letters Patent.  Patented May 18, 1915.

Application filed November 30, 1914. Serial No. 874,677.

*To all whom it may concern:*

Be it known that I, ANTON F. Voss, a citizen of the United States, residing in the city and county of San Francisco and State of California, have invented new and useful Improvements in Inlet and Relief Valves for Pneumatic Tires, of which the following is a specification.

This invention relates to valves for automobile tires and other apparatus.

It is the object of this invention to provide a compact, durable, simple, quick adjustable air valve for pneumatic tires which will serve both as an inlet valve and as an automatic relief valve. It is especially adaptable for use in structures where air is pumped into a desired and safe pressure and where the structure is so exposed that the compressed air is likely to be raised in temperature and thus cause an undesirable increase in pressure. Automobile tires are particularly liable to become heated and are often bursted by the resultant increment of pressure and this valve is readily applied to the tire tubes and will automatically blow off at a predetermined maximum pressure.

The invention consists of the parts and the combination and construction of parts as hereinafter more fully described and claimed, having reference to the accompanying drawings, in which—

Figure 1 is a central longitudinal section of the preferred form of valve. Fig. 2 is a detail of the channeled stem guide. Fig. 3 is a sectional detail of the relief valve. Fig. 4 is a detail of the inlet valve.

2 indicates an externally threaded tubular body with a flange 3 at one end against which the rubber tube wall 4 is clamped and locked by nuts 5.

In the tube is formed shoulder 6 for a loose collar 7 on a spindle 8 with a disk 9 which forms a valve closure. Between the collar and the disk 9 is a spring 10 which forces the disk to a seat 11 on the adjacent end of a tubular stem 12 through which the spindle 8 extends. This guide has an external shoulder 13 acting as a valve when pressed by a spring 14 onto an annular seat 15 in the valve body 2.

The spring 14 reacts against a pressure adjusting channeled screw 16 threaded in the body at 17 and through which extends the hollow stem 12 of valve 13. After the screw 16 has been turned to give the spring 14 the desired pressure on the upwardly opening valve 13, it is locked by nut 18. The screw 16 is threaded at 19 to receive a cap 20; these parts being covered by a shell 21 screwed onto the body 2.

In operation as the attached air container, or tire tube 4, is charged with compressed air by a pump, the spindle valve 9 automatically opens inwardly off its seat 11 and seats with the aid of the spring 10 and air pressure. When the pressure in the container exceeds that of the relief valve 13 on its seat 15, this valve lifts and air escapes along channels 22 in the screw 16 and into the shell 21. This is provided with an outwardly opening vent valve 23 provided as a dust guard and to let out the escaping air.

Having thus described my invention, what I claim and desire to secure by Letters Patent is—

A device of the type described including a tubular member having a plurality of differently diametered bores in stepped relation to each other, the upper resultant shoulder forming a valve-seat, a second tubular member positioned with the aforesaid tubular member and having an annular valve-formation intermediate its ends, the lower end portion of said second tubular member extending into the intermediate lesser diametered bore, a third tubular member receiving said second tubular member and having threaded connection with the upper inner surface of the first referred to tubular member, a pressure exerting member intermediate said valve formation and the lower end of said third referred to tubular member, said third referred to tubular member having a longitudinal air passage traversing the threads thereof, a cap or closure for said third tubular member and an inclosure for the latter referred to members and the upper portion of the first referred to member, said inclosure forming a chamber receiving the air pressure via said longitudinal air passage of said third tubular member, and a spindle extending through said second tubular member and into the most constricted bore of said first referred to bore and having a loose collar applied to its lower end, resting upon the resultant lower shoulder of the first referred to tubular member, said spindle having a fixed valve thereon engaging the lower end of said second tubular member and a pressure exerting member applied to said spindle intermediate said collar and the latter valve.

In testimony whereof I have hereunto set my hand in the presence of two subscribing witnesses.

ANTON F. VOSS.

Witnesses:
 Roy Stewart,
 E. N. Fourcous.